No. 623,059.  
T. W. WOOD.  
CHURN.  
(Application filed Apr. 16, 1898.)  
(No Model.)  
Patented Apr. 11, 1899.

Witnesses  
Geo. E. Frech  
B. E. Seitz

Inventor  
T. W. Wood  
by A. S. Pattison  
Attorney

UNITED STATES PATENT OFFICE.

TIMOTHY W. WOOD, OF RICHMOND, VIRGINIA.

CHURN.

SPECIFICATION forming part of Letters Patent No. 623,059, dated April 11, 1899.

Application filed April 16, 1898. Serial No. 677,821. (No model.)

*To all whom it may concern:*

Be it known that I, TIMOTHY W. WOOD, a citizen of the United States, residing at Richmond, in the county of Henrico and State of Virginia, have invented new and useful Improvements in Churns, of which the following is a specification.

My invention relates to improvements in churns, and pertains to that class in which the body of the churn is suspended upon movable supports, whereby it can be swung back and forth, all of which will be fully described hereinafter and particularly referred to in the claims.

Figure 1:
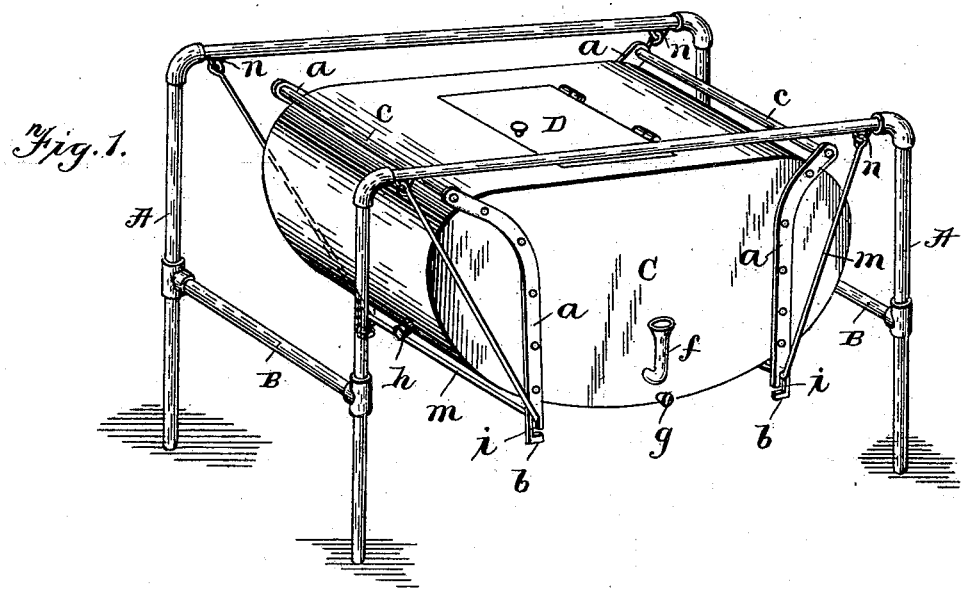
Figures 2, 3:
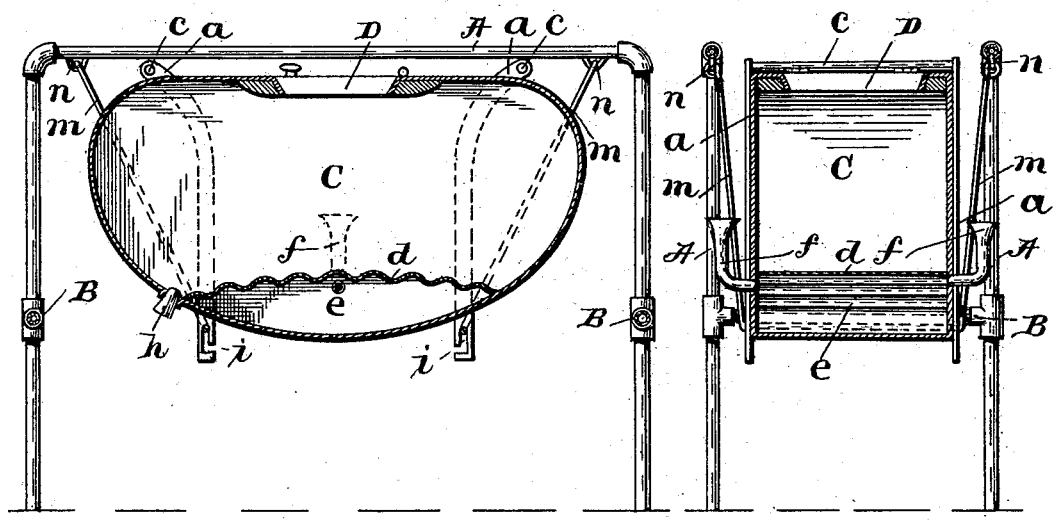

Referring now to the drawings, Figure 1 is a perspective view of a churn embodying my invention. Fig. 2 is a side elevation, partly in section. Fig. 3 is a transverse vertical section.

Referring now to the drawings, A indicates two inverted-U-shaped frames, preferably formed of pipings, which are arranged side by side and parallel, the said frames being firmly united intermediate their stem portions by means of the connections B. This arrangement, as illustrated in the accompanying drawings, produces a frame with a space between the sides thereof for the churn-body C. This churn-body is provided with an opening in its top closed through the medium of a cover D, through which the milk and cream are placed to be churned. The body as here shown is practically oval in shape in side elevation, and secured to the sides of the body near each end are the bars $a$. These bars have their lower portions straight and extending below the bottom of the body of the churn, as illustrated, to form the seat $b$, upon which the body may rest when removed from the supports. The upper ends of these bars $a$ are curved outward and extend beyond the edge or side of the body and have their extremities connected by means of the bars $c$, which form handles.

The bottom of the churn is provided with a corrugated bulged or extended portion $d$, which furnishes a chamber $e$ at the bottom of the churn-body, as clearly shown. The object of this chamber is to provide a receptacle for the reception of either warm or cold water to regulate the temperature of the cream and milk being churned for the purpose of facilitating its conversion to butter. The corrugating of the top of this receptacle, as shown, furnishes means for chafing the milk as it passes thereover, which will cause the globules of fat in the milk to form with greater rapidity into butter.

A vertical tube $f$ is provided at each side of the body of the churn and has its lower extremity communicating with the chamber $e$, the upper end of one or both of these tubes being funnel-shaped, as shown. In operation the water is poured in one of these tubes and air passes out of the other. An exit-opening $g$ is provided for this receptacle $e$ and an exit-opening $h$ for the body proper of the churn.

The lower ends of the bars $a$ are provided with the L-shaped openings $i$, which receive the U-shaped supporting-wires $m$. The ends of these supporting-wires $m$ are connected with the frame A either by means of eyes $n$, as here shown, or in any desired manner. The object of having the L-shaped openings $i$ in the lower ends of the bars is twofold—first, to prevent the slipping out of the wire, and, second, to provide broad lower ends to act as supports when they are used as feet for supporting the churn.

The body C of the churn may be made of any desired material, but preferably of tin, in that it makes it light to handle and enables it to be put in the sun to sweeten. The bars $a$ serve a threefold function of acting as strengthening devices for strengthening the body of the churn, as feet for supporting the churn when removed from the supporting-wires, and as handles for working the body when churning.

It will be noted that the two U-shaped wires have their ends attached to the frame at points farther apart than the lower ends of the bars $a$, whereby they are out of line with their point of support at the churn-body, which will give the body a peculiar movement which describes practically a figure 8, which is found to be very advantageous in separating the globules of fat from the milk and facilitates the churning operation.

It will be noted that the two U-shaped frames have their upper sides flat, whereby they are adapted to be used as a table by placing the boards on top of them either for the purpose of supporting the churn when it is removed or for acting as a table when the churn is in position, in that the churn and its handles are below the top of the bars, so that there is nothing to interfere with such use of the frame.

Having thus described my invention, what I claim, and desire to secure by Letters Patent, is—

1. A rocking-body churn, comprising a churn-body, a supporting-frame, and combined feet-supports and handles consisting of rigid bars secured to opposite sides of the churn with their upper and lower ends projecting beyond the upper and lower edges of the body, the lower ends of the bars provided with sockets, and transverse bars connecting their projecting ends to form a handle, and supporting connections resting in said sockets and their upper ends swingingly connected to the supporting-frame, substantially as described.

2. A rocking-body churn comprising a supporting-frame, a body, rigid arms secured to the sides of the body, the upper and lower ends of the arms projecting beyond the upper and lower sides of the body, the said arms having their upper portions curved outward and their projecting upper ends connected by a transverse bar, the lower projecting ends of the bars having inward-opening sockets, and depending links having their upper ends swingingly connected to the supporting-frame and their lower ends resting in said sockets, substantially as described.

In testimony whereof I have hereunto set my hand in the presence of two subscribing witnesses.

TIMOTHY W. WOOD.

Witnesses:
S. R. SPENCER,
GEO. ROBINSON.